Oct. 25, 1932. E. G. PETERSEN 1,884,195
SHUTTER UNIT
Original Filed April 9, 1928 3 Sheets-Sheet 2
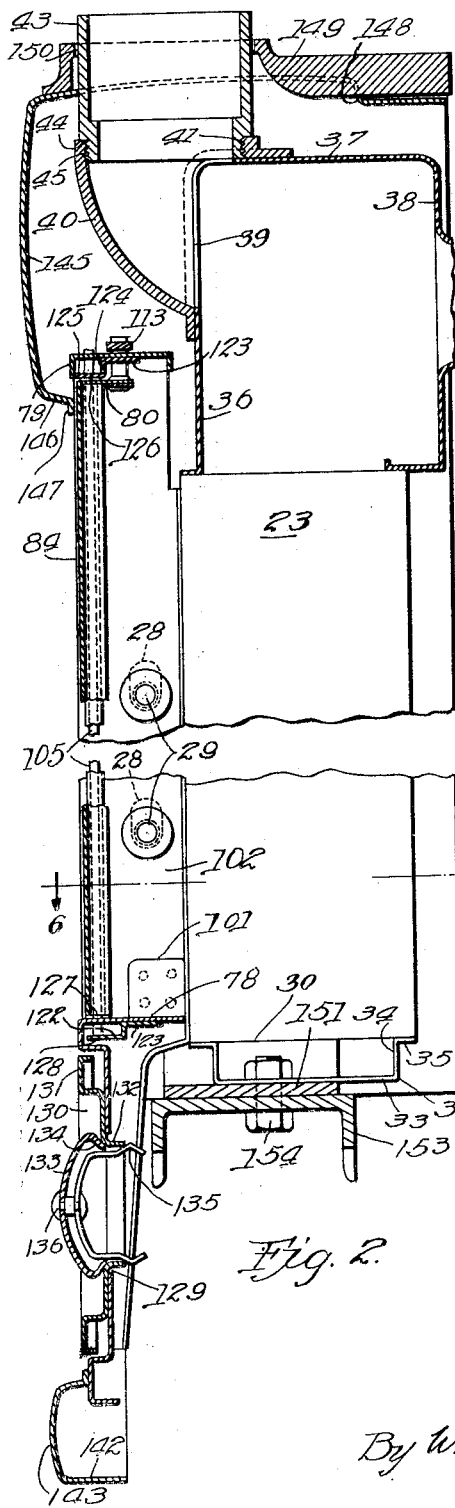
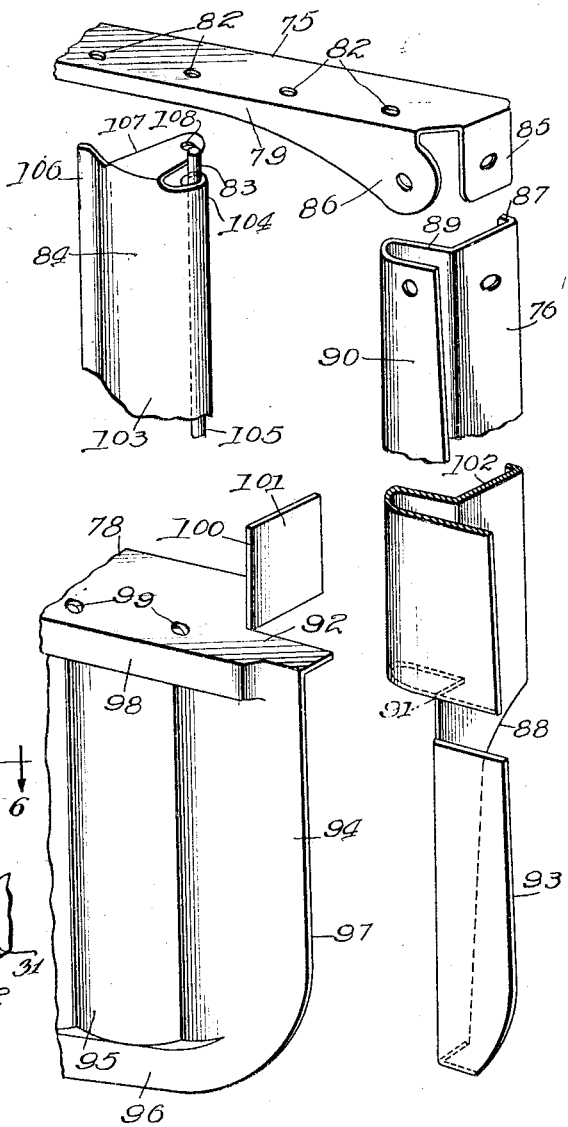
Fig. 5.
Fig. 2.
Inventor:
Edgar G. Petersen,
By Williams, Bradbury, McCaleb & Hinkle
Att'ys.

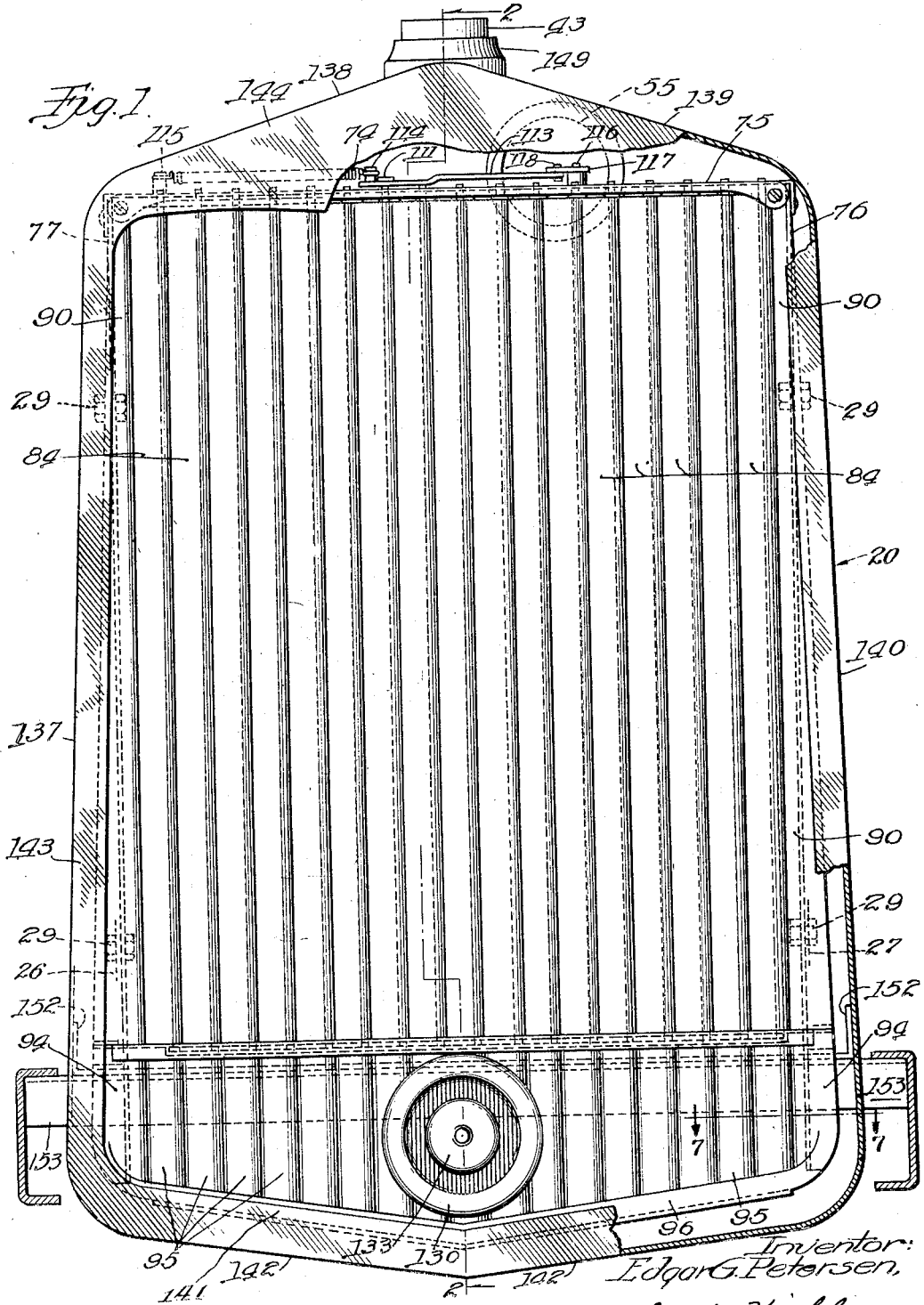

Oct. 25, 1932.　　　E. G. PETERSEN　　　1,884,195
SHUTTER UNIT
Original Filed April 9, 1928　　3 Sheets-Sheet 3
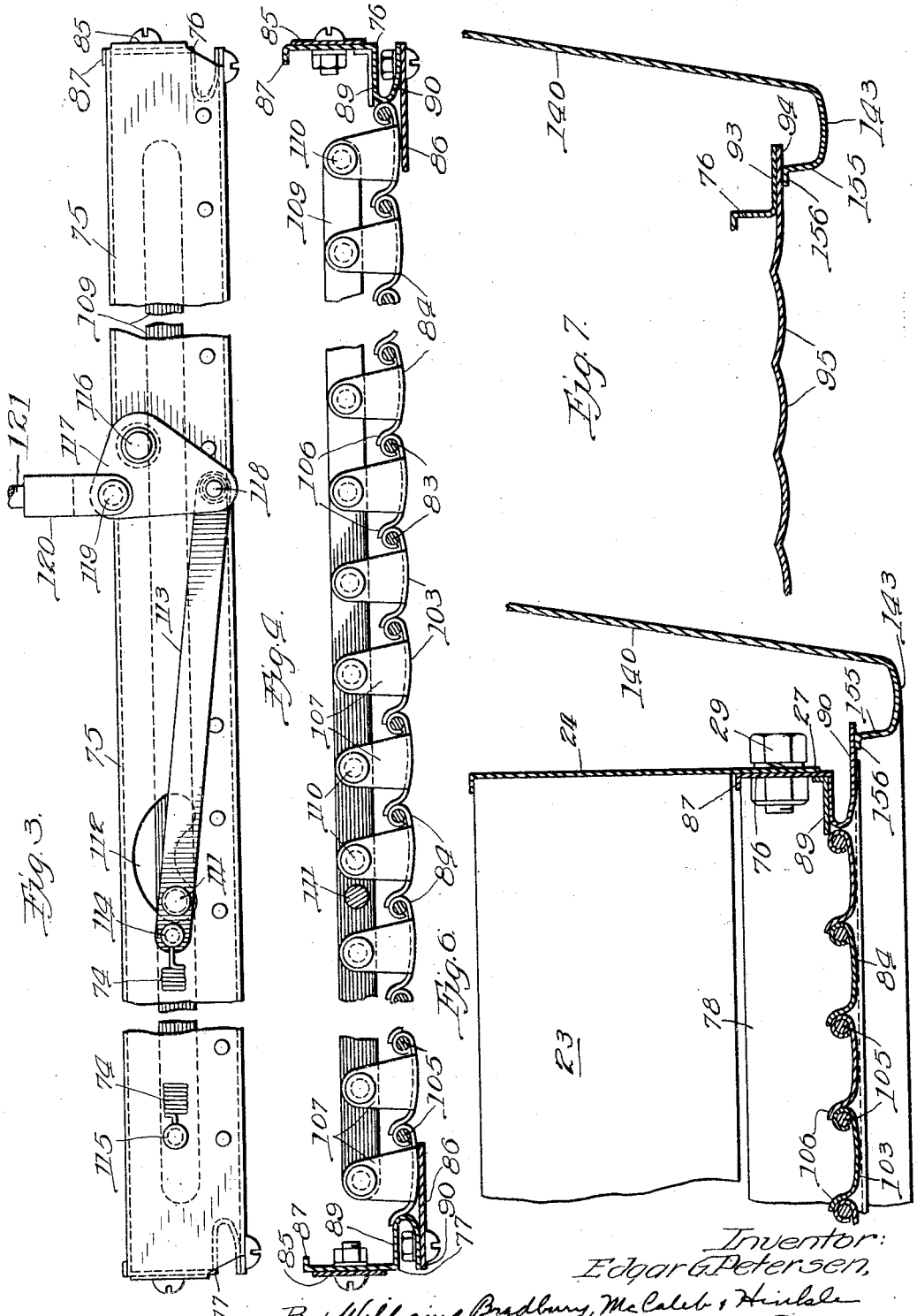

Patented Oct. 25, 1932

1,884,195

UNITED STATES PATENT OFFICE

EDGAR G. PETERSEN, OF CHICAGO, ILLINOIS, ASSIGNOR TO PINES WINTER FRONT COMPANY, OF CHICAGO, ILLINOIS, A CORPORATION OF DELAWARE

SHUTTER UNIT

Original application filed April 9, 1928, Serial No. 268,491. Divided and this application filed March 19, 1930. Serial No. 436,939.

The present invention relates to radiator shutters, and is particularly concerned with built-in shutters for the radiators of internal combustion engines. The present application is directed particularly to the radiator shutter unit per se and is a divisional application of my prior application, Serial No. 268,491, filed April 9, 1928.

One of the objects of the present invention is the provision of a novel radiator and shutter assembly, whereby the radiator core, shutters and shell are carried directly by the chassis of the vehicle, thereby relieving the radiator core of excess weight and diminishing the possibility of radiator leaks caused by the support of any structure upon the less durable parts of a radiator core.

Another object of the invention is the provision of novel means of support for a radiator core, radiator shutters and radiator shell, including means for carrying said parts directly from the chassis of a vehicle by independent supporting means, eliminating the fastening means between these elements which has been employed in the structures of the prior art.

Another object of my invention is the provision of a novel shutter and radiator core assembly comprising a shutter frame supported directly upon integral flanges carried by the radiator core and eliminating the prior modes of support which are apt to damage the core structure.

Another object of the invention is the provision of a novel built-in shutter assembly capable of long periods of service without rattling, and which includes a plurality of false shutters for permanently closing the lower openings of the radiator core where the cooling fluid is liable to freeze at extremely low temperatures.

Another object is the provision of an improved radiator shutter unit which is more sturdy than the shutter units of the prior art, which is peculiarly adapted to be secured to and carried by a radiator core in an improved manner and which is capable of co-operating with the radiator shell to form a non-rattling built-in shutter unit which is capable of long service without necessity for repair or replacement.

Another object is the provision of a shutter unit which is provided with resilient means for engaging a radiator shell or other enclosing frame to produce a substantially airtight connection between these parts and to eliminate the possibility of rattling.

Another object is the provision of a shutter unit including a frame of improved construction, the parts of which are secured together in an improved manner to provide a framework which is more rigid yet lighter than the devices of the prior art.

Other objects and advantages of my invention will appear more fully from the following description and from the accompanying drawings, in which similar characters of reference indicate similar parts throughout the several views.

Referring to the drawings:

Figure 1 is a front elevational view in partial section showing the complete installation which includes the present radiator shutter unit;

Figure 2 is a sectional view taken on the plane of the line 2—2 of Figure 1;

Figure 3 is a top plan view of the shutter unit;

Figure 4 is a sectional view of the shutter unit taken on a plane just below the upper frame member;

Figure 5 is an exploded view of the parts of the shutter frame;

Figure 6 is a fragmentary sectional view taken on the plane of the line 6—6 of Figure 2;

Figure 7 is a similar view taken on the plane of the line 7—7 of Figure 1.

Referring to Figures 1 and 2, 23 indicates a radiator core having a pair of lateral frame members 24, preferably formed of sheet metal and forming the sides of a core of the usual construction having honeycombed channels, tubes or other members adapted to permit the circulation of water and to present an increased cooling area for the passage of air. The exact construction of the honeycombed portion of the core is immaterial, and does not affect the merits of the present invention.

The side frame members 24 of the core form the outer walls of the core, and are provided with integral forwardly projecting flanges 26, 27 to support the shutter frame and shutters, further to be described.

The integral flanges 26 and 27 are provided with elongated apertures 28 of the attachment of the shutter frame by a plurality of bolts 29, the elongated apertures permitting a slight adjustment of the shutters and frame relative to the core. The base of the radiator core 23 may be enclosed by a sheet metal wall 30 and the back of the core provided with the usual conduit 31 for water circulation. Where the radiator core is of less length than required to rest upon the chassis member, I provide a channeled sheet metal member 32 for supporting the core directly upon the chassis. The channeled member 32 may have a supporting flange 33, transverse flanges 34 and a pair of outwardly turned attaching flanges 35 secured to the bottom wall of the core by spot welding or other convenient fastening means.

The upper portion of the radiator core includes a chamber having outside walls 36, 37 and 38, the rear wall 38 being provided with the usual conduit for connecting the upper portion of the radiator to the water jacket of an internal combustion engine. The upper wall 37 and front wall 36 are provided with an aperture 39 over which is welded a cast metal spout fitting 40 formed substantially like an elbow, and having an upper aperture 41 adapted to receive the radiator spout. The elbow 40 and sides of water box are preferably so arranged that the elbow is adapted to clear the top wall of the radiator shell when the channeled member 32 has been placed upon the supporting member 153 of the radiator shell (further to be described).

The elbow 40 of the radiator is adapted to receive a sectional spout 43 of the type shown in Figure 2, comprising a substantially cylindrical member having its lower end turned down to form a shoulder as at 44, and threaded as at 45 to fit complementary threads in the aperture 41. After the radiator shell has been placed upon the core, the spout 43 may be inserted from the top of the radiator shell and threaded into the elbow 40, thereby completing the assembly of the built-in shutter unit.

The improved shutter unit construction which forms the subject of the present application is peculiarly adapted to be utilized in the assembly shown in Figures 1 and 2, and the improved shutter frame construction is best illustrated in Figure 5. The shutter frame preferably consists of an end frame member 75 at the top, a pair of side frame members 76 and 77 and a second end frame member 78 at the bottom.

The end frame member 75 comprises a sheet metal strip, preferably of steel, having a downwardly extending flange 79 on its front side adapted to cover a non-rattling bearing strip 80, further to be described. The frame member 75 may also be formed with a depending flange 81 at its rear edge for stiffening the same, and is provided with a plurality of equally spaced apertures 82 for receiving the trunnions 83 of a plurality of shutters 84. At each end, the end frame member 75 may be provided with an attaching flange 85, bent down at substantially right angles, and the flange 79 may be widened as at 86 to provide an auxiliary attaching flange on the front of the frame member.

The side frame members 76 may be formed of a similar strip of sheet metal having a narrow flange 87 bent inward at substantially right angles on the rear edge to form a channel, except at the bottom 88, where the flange and a portion of the frame member have been cut away to accommodate the chassis of the particular vehicle to which it is applied. At its forward edge, the frame member 76 is provided with a flange 89 bent inward at substantially right angles and turned back on itself to form an apron 90, which tapers from the top of the shutters to the bottom and fills in the space between a rectangular fenestration for the shutters and the inner edge of the shell 20, where the shape of the engine hood tapers to the top. The flanges 89 and apron 90 do not extend the full length of the frame member, but terminate at the lower end of the shutters where the main body of the frame members 76 is formed with an upwardly extending corner 91 adapted to fit beneath the horizontal flange 92 of the bottom frame member 78. The frame members 76 are also provided at their lower ends with an outwardly extending flange 93 located substantially in the plane of the apron 90 and fitting against the rear side of the false shutters 94 at their outer edge to reenforce and support the same.

The lower frame member 78 comprises a stamped sheet metal member, preferably of steel, having a plurality of false shutters 95 of the same size as the shutters 84 stamped therein, together with a substantially flat edge 96 for engagement with the inner edge of the shell 20. The outer edge 97 of the false shutter plate 94 conforms substantially to the inner boundary of the shell 20 projecting beneath said boundary and being engaged thereby. The frame member 78 may be formed with a pressed bead 98 at the upper end of the false shutters 95, one side of the bead comprising the horizontal flange 92, having a plurality of apertures 99 to receive the trunnions of the shutters 84. At each end the flange 92 is slit as at 100 and turned up to form an attaching flange 101 of sufficient width to be received in the channels 102 of the side frame members.

The flat surface 96 of the false shutter apron and the forward surface of the flange or apron 90 are adapted to resiliently engage the contacting flange 156 of the radiator shell 20, and to prevent any rattling between the shutter unit and the shell. These parts also form a substantially air-tight joint between the shell and shutter unit so that substantially all of the air passing through the fenestration in the shell 20, is controlled by the shutters 84.

Centrally located in the false shutter plate 94 is an aperture 129 adapted to register with the engine shaft for the insertion of a crank, and this aperture may be finished by a stamped sheet metal ring 130 having an outer annular bead 131 and an inner flange 132 adapted to fit in the aperture 129. The aperture may be closed by a stamped metal cap 133 having an inwardly turned annular flange 134, adapted to fit the boundary of the flange 132, and the cap 133 may be secured in place by a pair of spring fingers 135 engaging the flange 132 and secured to the cap by a rivet 136.

The false shutter plate 94 is thus adapted to permanently close the lower end of the radiator core, and provide a finished appearance simulating shutters which extend the full height of the front of the radiator.

The shutters 84 comprise strips of sheet metal, preferably steel, outwardly curved as at 103 and having one edge 104 curved about a rod 105 which projects at either end of the shutter and forms the trunnions 83. The opposite edge of the shutter is formed with a pressed curved groove 106 adapted to fit against the curved portion 104 of the adjacent shutter, to completely seal the intervening opening when the shutters are in closed position, and each of the shutters is provided with an actuating arm comprising an inwardly turned flange 107 at its upper end and having an aperture 108.

The shutters may be secured together for simultaneous actuation by a shutter bar 109, provided with a plurality of rivets 110 passing through the apertures 108 in the flanges 107 on the shutters. The actuating bar 109 bears a rivet 111 projecting upward through an arcuate slot 112 in the upper frame member 75, the rivet 111 providing a pivotal connection with a link 113. The actuating bar 109 and the link 113 are biased toward the left in Figure 7 by a coil spring 74, secured to one end of the link 113 by being hooked about a rivet 114 and secured at its other end by being hooked about a rivet 115 carried by the frame member 75.

The present shutter unit may be actuated by any type of actuating device, thermostatic, manual or otherwise, but is illustrated in connection with the thermostatic device disclosed in said prior application. The thermostat is preferably located in a thermostat chamber 55 carried by the water box of the radiator core and the thermostat is provided with operative mechanical connections to the mechanism of a shutter unit by means of a connecting rod 121.

At a point opposite the thermostat chamber 55, the frame member 75 carries a rivet 116, which pivotally supports a bell crank 117, formed for convenience of a tri-angular piece of metal and pivotally secured as at 118 to the link 113. The other corner of the bell crank 117 is pivotally secured by rivet 119 to a yoke 120 in which a connecting rod 121 may be threaded or otherwise secured. The assembly of the shutter and frame members may be accomplished as follows:

The shutters 84 may be first pivotally connected by means of the shutter bar 109 and the side frame members 76 may be attached to the lower frame member 78. In attaching these frame members, the attaching flange 101 is received in the channel 102 and the lower edge of the apron 90 rests upon the upper flange 92 of the false shutter plate. The flange 89 and apron 90 project past the attaching flange 101 and provide a finished side for the front of the shutter frame, and the flange 101 may be secured to the side frame member by spot welding, riveting or other convenient fastening means. The shutters which are secured together by the actuating bar may then have their lower trunnions inserted in the apertures 99, and the upper frame member 75 may be put in place with the upper trunnions 83 in the apertures 82.

The attaching flange 86 of the upper frame member is adapted to be riveted, bolted or spot welded to the upper edge of the apron 90, while the attaching flange 85 is similarly fastened to the upper edge of the body of the side frame 76. The cut-out space between these flanges receives the upper edge of the flanges 89 and the apron 90, permitting the foregoing method of assembly, which provides a frame member that is light, durable and very strong.

In order to guard against the rattling of the shutters 84, I prefer to provide resilient members 80 and 122 for pressing against the ends of the shutters and the ends of the lower trunnions respectively. The antirattling member 80 comprises a sheet metal strip having an attaching flange 123, a flange 124 at substantially right angles thereto and a flange 125 parallel to the frame member 75, and provided with a plurality of apertures which register with the apertures 82. The width of the flange 124 is substantially equal to that of the flange 79 forming a box-like enclosure through which the trunnions 83 pass, and the flange 125 presses against washers 126 on the upper ends of the shutters, urging the shutters against washers 127 between the shutters and lower frame member 78. The anti-rattling member 122 is of similar form, but is not provided with registering apertures, its lower flange 128 resiliently engaging the ends of the rods 105 which form the trunnions for the shutters. Both the anti-rattling members 80 and 122 may be secured to the upper and lower frame members, respectively, by spot welding at the flange 123, or other convenient fastening means, and these members are preferably secured to the frame members before the shutter frame is assembled.

The radiator shell 20 comprises a finished sheet metal member having exterior walls 137, 138, 139, and 140 which conform to the shape of the hood desired. The exterior walls 140 and 137 merely extend down to a point sufficient to cover the radiator core, while the forward edges of these walls project downward as at 141 to enclose the outer edges of the false shutter plate. The bottom wall 142 may likewise conform to the boundary of the false shutter plate. The shell 20 is provided with an inwardly extending flange 143 on the walls 137, 140 and 142, this flange projecting over the apron 90 and the flange 96 of the false shutter plate. In order to provide a finished appearance for the shell, the flange 143 may be turned backward as at 155 and provided with a contacting flange 156 substantially parallel to the aprons 90 and to the boundary 96 of the false shutter plate. The upper front of the radiator shell is likewise provided with a depending flange or wall 144 adapted to project down over the shutter mechanism to a point just below the upper end of the shutters. The wall 144 is preferably outwardly curved as at 145, having an inwardly extending flange 146 at its lower boundary and a contacting flange 147 engaging the shutters when in closed position. The upper wall 138 of the shell is provided with an aperture 148 which is finished with a cast metal crown piece 149 having an aperture 150 located to receive the radiator spout 43.

In order to support the radiator shell directly upon the chassis of the vehicle, I provide a transverse frame member 151 comprising a relatively thick strip of metal having upwardly turned ends 152, which may be spot welded within the outer walls 137 and 140 of the shell. The supporting member 151 is adapted to rest directly upon a transverse frame member 153 of the chassis and provide direct support for the shell upon the chassis of the vehicle.

The method of assembly of the radiator core, shutter unit and shell is as follows:

The shutter frame is attached to the radiator core by a plurality of bolts or other convenient fastening means, passing through the side frame members 76 and the integral attaching flanges 26 on the radiator core, the spout 43 having been removed from the radiator core. The shell 20 as shown in Figure 4 may be placed upon the combined core and shutter by tilting the upper end of the core backward so that the shell may be slid up from below with the false shutter apron projecting between the supporting member 151 and the lower flange 143. It should be observed that the difficulty here involved consists in placing the shell upon the core and shutter when a part of the shell goes behind the shutter and another part goes in front of the shutter, and this is accomplished by sliding the shell up about the false shutter apron.

When the shell has reached the proper elevation relative to the core and shutter frame, the top of the shell may be swung to the right in Figure 2, over the top of the core until the aperture 150 registers with the aperture 41 of the spout, whereupon the spout 43 may be affixed as previously described. The core and shell may be secured together at their lower ends by bolts 154 passing through the supporting member 33 on the core, through the supporting member 151 on the shell and through the chassis frame member 153, when the complete device is assembled upon the chassis of the vehicle.

It should be noted that when the supporting cross bar is used, the radiator shell, shutter and radiator core must be completely assembled before the assembly is installed upon the chassis of the automotive vehicle; but when the cross bar is not employed and some other means of support is used for the shell, the elements may be separately assembled with the chassis of the vehicle.

It will thus be observed that I have provided a novel radiator shutter assembly in which the core and shell are both directly carried by the chassis of the vehicle and the shutter frame is supported by integral attaching flanges carried by the core. The radiator and shutter assembly is capable of long periods of rough usage, without possibility of damage to the fragile parts of the radiator core and without causing any rattling.

The present radiator shutter unit is provided with improved forms of anti-rattling bearings, an improved anti-rattling form of connection with a radiator shell and with an improved framework which is lighter but stronger than the device of the prior art. The operating mechanism is simple yet effective and all of the parts of the mechanism are adapted to be concealed by the frame of the shutter unit and the radiator shell.

While I have illustrated and described a specific embodiment of my invention, many modifications may be made without departing from the spirit of the invention, and I do not wish to be limited to the precise details set forth, but desire to avail myself of all changes within the scope of the appended claims.

Having thus described my invention, what I claim as new and desire to secure by Letters Patent of the United States is:

1. In a radiator shutter device for internal combustion engines, the combination of a shutter frame, with a plurality of shutters pivoted therein, said frame comprising an end frame member having attaching flanges at its ends and sides, side frame members having flanges at substantially right angles to each other for attachment to said flanges, and a second end frame member having attaching flanges for engagement in channels in said side frame members.

2. In a radiator shutter device for internal combustion engines, the combination of a shutter frame, with a plurality of shutters pivoted therein, said frame comprising an end frame member having attaching flanges at its ends and sides, side frame members having side flanges at substantially right angles to the body of said frame members for attachment to attaching flanges on said end frame member, and a second end frame member having attaching flanges for engagement with the body of said side frame members.

3. A shutter unit comprising an end frame member formed with inwardly extending flanges, side frame members formed with inwardly extending flanges, secured to the inwardly extending flanges on said end frame member, attaching flanges carried by said frame members for securing said end frame member to said frame members, a second end frame member having attaching flanges secured to said side frame members, a plurality of shutters having trunnions pivotally mounted in said end frame members, said shutters having inwardly extending actuating arms, a shutter bar pivotally connecting a plurality of shutter arms, a stud fixedly mounted on said shutter bar and projecting outwardly through an arcuate slot in one of said end frame members and means for moving said stud in said slot to actuate said shutters.

4. A shutter unit comprising an end frame member formed with inwardly extending flanges, side frame members formed with inwardly extending flanges, secured to the inwardly extending flanges on said end frame member, attaching flanges carried by said frame members for securing said end frame member to said frame members, a second end frame member having attaching flanges secured to said side frame members, a plurality of shutters having trunnions pivotally mounted in said end frame members, said shutters having inwardly extending actuating arms, a shutter bar pivotally connecting a plurality of shutter arms, a stud fixedly mounted on said shutter bar and projecting outwardly through an arcuate slot in one of said end frame members, a bell crank pivotally mounted on said latter frame member, a link connecting one arm of said bell crank and said fixed stud and a spring tension between said link and said framework to urge said shutters to closed position.

5. A shutter unit comprising an end frame member formed with inwardly extending flanges, side frame members formed with inwardly extending flanges, secured to the inwardly extending flanges on said end frame member, attaching flanges carried by said frame members for securing said end frame member to said frame members, a second end frame member having attaching flanges secured to said side frame members, a plurality of shutters having trunnions pivotally mounted in said end frame members, said shutters having inwardly extending actuating arms, resilient means carried by one of said end frame members for engaging the ends of said shutters and resilient means carried by one of said frame members engaging the ends of said trunnions.

6. In a radiator shutter unit, the combination of a pair of side frame members having forward and rear inwardly projecting flanges, said forward, inwardly projecting flanges being folded outward to form a laterally projecting facing flange, and end frame members having inwardly projecting attaching flanges adapted to be received by said side frame members between said forward and rear inwardly projecting flanges to secure said frame members together.

7. In a radiator shutter unit, the combination of a pair of side frame members having forward and rear inwardly projecting flanges, said forward, inwardly projecting flanges being folded outward to form a laterally projecting facing flange, and end frame members having inwardly projecting attaching flanges adapted to be received by said side frame members between said forward and rear inwardly projecting flanges to secure said frame members together, one of said end frame members having inwardly projecting attaching flanges located adjacent each end for securement to said facing flange.

8. In a radiator shutter unit, the combination of a bottom frame member comprising a stamping formed with a shelf having a plurality of apertures forming bearings for shutter trunnions, said bottom frame member having a depending apron for closing a portion of a radiator core, and having upwardly projecting attaching flanges carried by said shelf, side frame members having channels for receiving said upwardly extending attaching flanges, and having downward extensions with laterally projecting flanges for engaging behind said apron, facing flanges carried by said side frame members and adapted to close the space between said shutter frame and a radiator shell, an end frame member having attaching flanges adapted to be received in said channelled side frame members, said end frame member having bearings for supporting shutter trunnions, and a plurality of shutters having trunnions pivotally mounted in said bottom frame member and end frame member.

In witness whereof, I hereunto subscribe my name this 14th day of March, 1930.

EDGAR G. PETERSEN.